US008928543B2

(12) United States Patent
Wang et al.

(10) Patent No.: US 8,928,543 B2
(45) Date of Patent: Jan. 6, 2015

(54) GYROTROPIC METAMATERIAL STRUCTURE (75) Inventors: Zheng Wang, Austin, TX (US); Marin Soljacic, Belmont, MA (US); Zhiyu Wang, Jinan (CN); John D. Joannopoulos, Belmont, MA (US); Lixin Ran, Hangzhou (CN)

(73) Assignee: Massachusetts Institute of Technology, Cambridge, MA (US)

( * ) Notice: Subject to any disclaimer, the term of this patent is extended or adjusted under 35 U.S.C. 154(b) by 261 days.

(21) Appl. No.: 13/548,572

(22) Filed: Jul. 13, 2012

(65) Prior Publication Data
US 2014/0085155 A1 Mar. 27, 2014

Related U.S. Application Data (60) Provisional application No. 61/507,348, filed on Jul. 13, 2011.

(51) Int. Cl.
*H01Q 19/00* (2006.01)
*H01Q 15/24* (2006.01)
*G02B 1/00* (2006.01)
*H01Q 15/12* (2006.01)
*H01Q 15/00* (2006.01)

(52) U.S. Cl.
CPC .............. *H01Q 15/246* (2013.01); *G02B 1/002* (2013.01); *H01Q 15/12* (2013.01); *H01Q 15/0086* (2013.01)
USPC ........ 343/756; 343/705; 343/911 R; 343/853; 343/741; 333/117; 333/156; 333/236; 333/245

(58) Field of Classification Search
USPC .......... 333/117, 156, 236, 245; 343/756, 705, 343/911 R, 853, 741
See application file for complete search history.

(56) References Cited

U.S. PATENT DOCUMENTS

2009/0204372 A1\* 8/2009 Johnston et al. .............. 702/191
2010/0079217 A1   4/2010 Morton et al.
2010/0277376 A1   11/2010 Chakam et al.

OTHER PUBLICATIONS

Shadrivov, Giant nonlinear optical activity in chiral metamaterials, Dec. 2010, IEEE, Optoelectronic and Microelectronic Materials and Devices (COMMAD), 2010 Conference, p. 87-88.\*
Shadrivov et al., "Giant nonlinear optical activity in chiral metamaterials" Optoelectronic and Microelectronic Materials and Devices, Conference on IEEE, Dec. 12, 2010, pp. 87-88.
Plum et al., "Extrinsic electromagnetic chirality in metamaterials" Journal of Optics A, Pure and Applied Optics, Institute of Physics Publishing, Bristol GB, vol. 11, No. 7, Jul. 1, 2009, pp. 1-7.

(Continued)

*Primary Examiner* — Sue A Purvis
*Assistant Examiner* — Jae Kim
(74) *Attorney, Agent, or Firm* — Gesmer Updegrove LLP (57) ABSTRACT

A gyrotropic metamaterial structure that include a plurality of chiral metamaterials forming one or more pairs of dipole structures. A plurality of lumped circuits are positioned between the one or more pairs of dipole structures. The lumped circuits have a plurality of subwavelengths antennas that are combined to change the polarization states of an incident polarized wave by producing Faraday-like rotation allowing for nomeciprocal propagation of the incident polarized wave.

17 Claims, 5 Drawing Sheets

(56) References Cited

OTHER PUBLICATIONS

Svirko et al., "Layered chiral metallic microstructures with inductive coupling" Applied Physics Letters, AIP, American Institute of Physics, Mellville, NY, vol. 78, No. 4, Jan. 22, 2001, pp. 498-500.

ISR and Written Opinion issued on Oct. 16, 2012, in connection with corresponding PCT Application No. PCT/US12/046647.

International Preliminary Report on Patentability mailed on Jan. 23, 2014 in connection with International Application PCT/US2012/046647, 8 pages.

Gansel et al., "Gold Helix Photonic Metamaterials as Broadband Circular Polarizer" Science, vol. 325, Sep. 18, 2009, pp. 1513-1515.

Liu et al., "Stereometamterials" Nature Photonics, vol. 3, Mar. 2009, Articles, pp. 157-162.

* cited by examiner

FIG. 4D

GYROTROPIC METAMATERIAL STRUCTURE

PRIORITY INFORMATION

This application claims priority from provisional application Ser. No. 61/507,348 filed Jul. 13, 2011, which is incorporated herein by reference in its entirety.

GOVERNMENT SPONSORSHIP

This invention was made with government support under Contract No. DMR-0819762 awarded by the National Science Foundation and Contract No. W911NF-07-D-0004, awarded by the Army Research office. The government has certain rights in this invention.

BACKGROUND OF THE INVENTION

The invention is related to field electromagnetic materials, and in particular to a bulk gyrotropic metamaterial with large Faraday-like rotation in the absence of an external magnetic bias.

Electromagnetic materials lacking local time-reversal symmetry, such as gyrotropic materials, are of keen interest and importance both scientifically and technologically. Scientifically, topologically-nontrivial phenomena, such as photonic chiral edge states, allow for reflection-free transport even in the presence of large disorder. Technologically, non-reciprocal photonic devices, such as optical isolators and circulators, play critical roles in optical communication and computing technologies due to their ability to eliminate cross-talk and feedback.

Nevertheless, most known natural materials that lack local time-reversal symmetry require strong external fields and function only in a limited range of the electromagnetic spectrum. Among natural mechanisms leading to gyrotropy, ferromagnetic resonance (1) is one of the strongest gyrotropic effects requiring a bias magnetic field at sub-Tesla levels, but is limited to the GHz frequency range. Magnetized plasma (2) and Zeeman splitting of optical dipole transitions do provide gyrotropy at optical frequencies, but at a very weak level even with a biasing field of several Tesla. These constraints, together with associated large absorption, have so far prevented large-scale application of nonreciprocal photonic systems. However, the recent advent of photonic crystals and metamaterials enabled synthesis of artificial composite materials, possessing previously nonexistent electromagnetic properties, such as negative indices of refraction.

SUMMARY OF THE INVENTION

According to one aspect of the invention, there is provided a gyrotropic metamaterial structure. The gyrotropic metamaterial structure includes a plurality of chiral metamaterials forming one or more pairs of dipole structures. A plurality of lumped circuits are positioned between the one or more pairs of dipole structures. The lumped circuits have a plurality of subwavelengths antennas that are combined to change the polarization states of an incident polarized wave by producing Faraday-like rotation allowing for nonreciprocal propagation of the incident polarized wave.

According to another aspect of the invention, there is provided a system for inducing gyrotropic properties in a metamaterial structure. The system includes a plurality of chiral metamaterials forming one or more pairs of dipole structures. A plurality of lumped circuits are positioned between the one or more pairs of dipole structures. The lumped circuits have a plurality of subwavelengths antennas that are combined to change the polarization states of an incident polarized wave by producing Faraday-like rotation allowing for nonreciprocal propagation of the incident polarized wave.

According to another aspect of the invention, there is provided a method of inducing gyrotropic properties in a metamaterial structure. The method includes a forming one or more pairs of dipole structures having a plurality of chiral metamaterials. Also, the method includes producing Faraday-like rotation allowing for nonreciprocal propagation of an incident polarized wave by positioning a plurality of lumped circuits between the one or more pairs of dipole structures. The lumped circuits have a plurality of subwavelengths antennas that are combined to change the polarization states of the incident polarized wave.

DETAILED DESCRIPTION OF THE INVENTION

The invention describes unidirectional lumped electronic circuit elements with small subwavelength antennas oriented that are intentionally combined to change the polarization states. A bulk gyrotropic metamaterial with large Faraday-like rotation in the absence of an external magnetic bias is introduced. Highly nonreciprocal propagation is observed in both simulations and experiments, where up to 14.4 degrees of Faraday-like rotation occurs over a 0.1-wavelength-thick metamaterial layer.

Figure 1A:
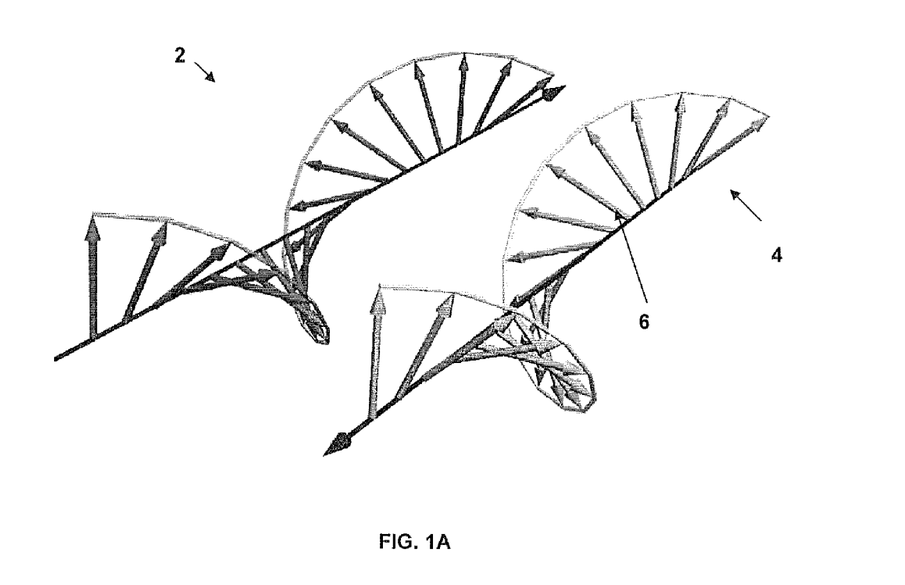
FIGS. 1A-1B are schematic diagrams illustrating how the polarized angle of a wave changes in a chiral medium and a gyrotropic medium.
Figure 1B:
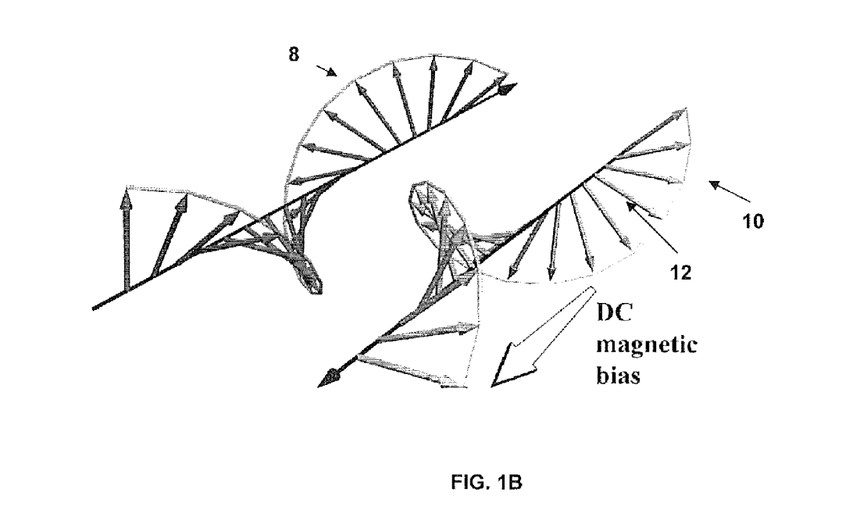

The Faraday effect is not only is a quintessential manifestation of the broken local time-reversal symmetry and the non-reciprocity of a gyrotropic medium, but also reveals important clues on the conditions necessary for construction of gyrotropic metamaterials. The Faraday rotation clearly differentiates gyrotropic materials from the closely related chiral materials, which, in contrast, are local time-reversal symmetric and reciprocal. In a chiral medium, a linearly-polarized traveling wave experiences a rotation of its polarization vector, with the direction of rotation determined by the wavevector k. FIGS. 1A-1B show a concrete illustration of how the polarized angle changes as the wave propagating through both chiral medium and gyrotropic medium. In FIG. 1A, when a linearly polarized wave 2 incidents a chiral medium along the axis, the resulting polarization 6 of the incident wave 4 rotates clockwise as the increasing of the propagation length. After a distance, the polarized angle of the incident wave 4 changes from the original value $\phi$ to $\phi + \Delta\phi$. When the wave 4 propagates in the opposite direction with the initial polarized angle $\phi + \Delta\phi$, the polarization 6 of the wave 4 rotates clockwise again back to the angle $\Delta\phi$. This behavior obeys the reciprocal theory which means the transmission property of the medium is irrelevant to the direction of the propagation.

While in FIG. 1B, when a linearly polarized wave 8 incidents a gyrotropic medium along the axis, assuming the polarization 12 of the incident wave 10 rotates clockwise in the same way as in the chiral medium, the polarized angle of the incident wave 10 also changes from the original value $\phi$ to $\phi+\Delta\phi$. But when the incident wave 10 goes back from the angle $\phi$ to $\phi+\Delta\phi$, the change of the polarization is no longer symmetric. The polarization of the wave 12 rotates anti-clockwise to $\phi+2\Delta\phi$. This means in the gyrotropic medium, the transmission property of the wave is nonreciprocal. This special behavior can be used in many applications.

Normal gyrotropic media used to be constructed by two kinds of media. One is plasma medium, and the other is ferromagnetic medium. Both of them need an external magnetic field to behave as a gyrotropic medium. In order to construct a gyrotropic medium without the external magnetic field, an active metamaterial is designed with a unit cell structure 20 shown in FIG. 2A.

Figure 2A:
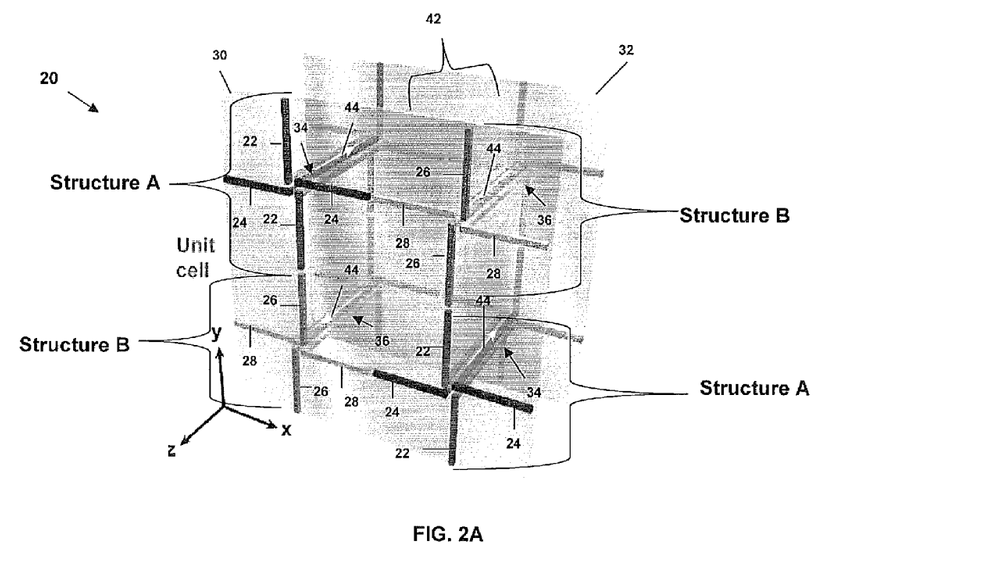
FIGS. 2A-2C is a schematic diagram and graphs illustrating a fully-polarized gyrotropic metamaterial and its results.

The passive part of the unit cell 20 is mixed by two kinds of chiral metamaterials. One includes two metallic structures 22, 24 called structures A having the same pattern on the top left and bottom right of the unit cell 20. Structure B includes two metallic structures 26, 28 with the same pattern on the top right and bottom left. Structure A has an anti-clockwise windmill shaped dipole on both front and back dielectric boards 30, 32 and four metallic wires 34 connected these two dipoles near the middle gap 42, while structure B has an clockwise windmill shaped dipole on both front and back dielectric boards 30, 32 and also four metallic wires 36 connected these two dipoles near the middle gap 42. Two amplifiers can be mounted at the center of each structure A with the direction from front side to back side and two amplifiers mounted at the center of each structure B with the direction from back side to front side to make the active metamaterial. The directions of the amplifiers in each structures A, B are marked by arrows 44. By the effect of the one way transmission property of the amplifier, the active metamaterial behaves as a gyrotropic medium.

Assume there is a vertically polarized wave normally incidents from the front dielectric board 30. Then half of the dipoles, the vertical dipoles, will couple the wave. In structure A, the vertical dipole 22 on the front dielectric board 30 receives part of the incident power and acts as the input of the amplifier mounted at the center. The received power amplified by the amplifier and then emitted through the horizontal dipole 22 on the back board 32. While the vertical dipole 24 on the back board 32 also receives part of the incident power, but then isolated by the amplifier and cannot emit through the horizontal dipole 22 on the front dielectric board 30.

In structure B, the vertical dipole 28 on the back dielectric board 32 receives part of the incident power and acts as the input of the amplifier mounted at the center. The received power amplified by the amplifier and then emitted through the horizontal dipole 28 on the front dielectric board 30. While the vertical dipole 26 on the front dielectric board 30 also receives part of the incident power, but then isolated by the amplifier and cannot emit through the horizontal dipole 26 on the back dielectric board 32. As a result of the effects caused by these two kinds of structures, the polarization of part of the incident wave which coupled into the amplifiers rotates 90 degree anti-clockwise. The output wave through the amplifier in structure B has a phase delay with the one through the amplifier in structure A. The incident wave with rest power which does not couple into the dipoles propagates directly though the structures without changing the polarization.

One can find that at a frequency, the phase difference of the coupled part and the uncoupled part of the output wave can be zero or just 180 degree. Thus the total output wave is still linear polarized with a changed polarized angle. In the case the incident wave is horizontally polarized, caused by the axial symmetric of the structures, the total output wave is linear polarized with the same polarized angle change at the same frequency. Therefore, the incident wave with any linear polarization can have this polarized angle change.

When the linearly polarized wave normally incidents from the back dielectric board 32, with the same technique, one can obtain that the polarization of part of the incident wave which coupled into the amplifiers rotates 90 degree clockwise. The output wave through the amplifier in structure A has a phase delay with the one through the amplifier in structure B. At the same frequency, the incident wave with any linear polarization can have an opposite polarized angle change. Therefore, the active metamaterial behaves as a gyrotropic medium with nonreciprocal polarized angle change.

Figures 2B, 2C:
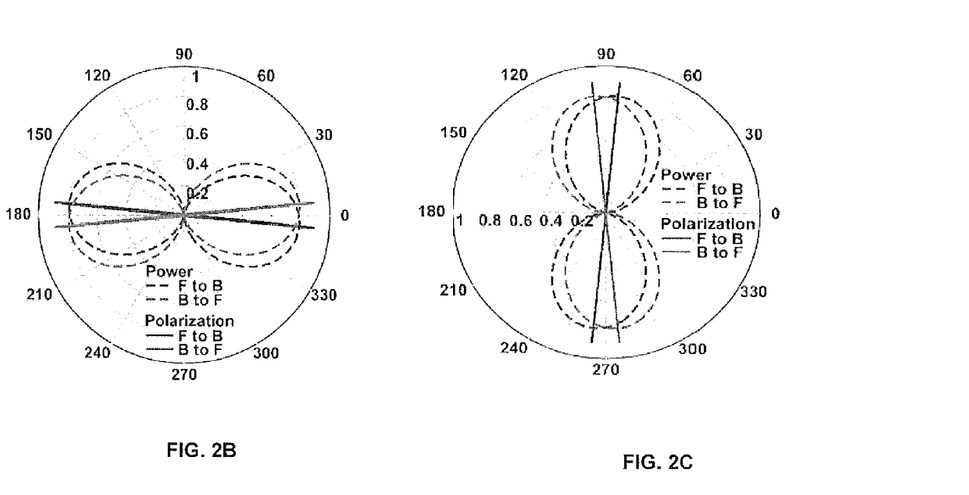

This property was verified by simulation using the commercial simulation software CST Microwave Studio and CST Design Studio. The dimension of the active metamaterial model is 60 mm*60 mm*30 mm and the length of each dipole is 29 mm with 1 mm gap at the middle. The front and back dielectric boards 30, 32 are 1 mm FR4 with relative permittivity 4.6. Choosing the high linear amplifier chip Avago MGA53543, one can obtain the gyrotropic properties at the frequency 805 MHz shown in FIGS. 2B-2C. Looking along from the source to the receiver, the polarized angle changes are −5.4 degree and +5.4 degree with incident directions from front dielectric board 30 to back dielectric board 32 and vice versa, respectively. FIG. 2B shows the simulated polarizations (solid) and power patterns (dashed) at the receiver when horizontally polarized wave at 805 MHz incidents in different directions. FIG. 2C shows the simulated results when vertically polarized wave at 805 MHz incidents in different directions. The DC voltage of the amplifier for these results is 0.67 V.

The above results are obtained by using the spice model of the amplifier MGA53543 at the chosen DC voltages without considering the circuit layout of the amplifier and wires for external DC supply. The structure of the active metamaterial becomes more complicated when one introduces the real circuit of the amplifier.

Figure 3A:
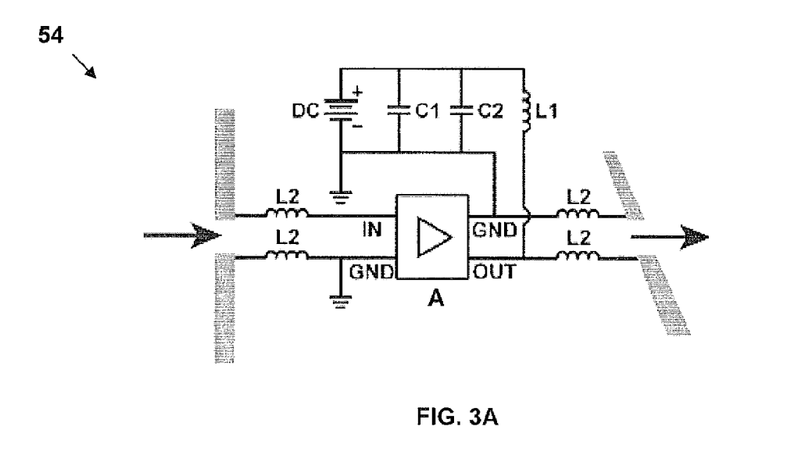
FIG. 3A is a circuit schematic illustrating a one unit cell.

Therefore, in order to simplify the experimental sample, a new circuit model with single polarized input is used instead. The schematic of the circuit model is shown in FIG. 3A. The capacitors C1 and C2 are used for decoupling. The inductor L1 is used for AC blocking. The inductors L2 are used for impedance matching with an amplifier A providing amplification.

Figure 3B:
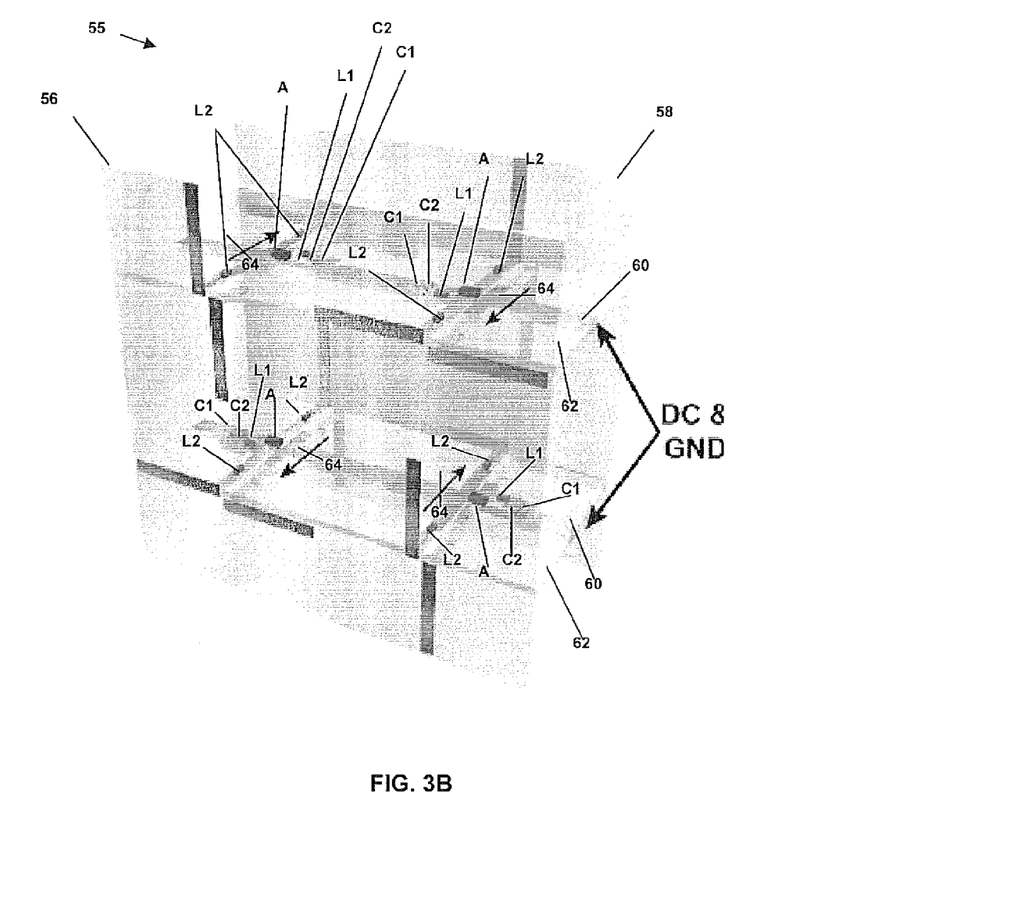
FIG. 3B is a schematic diagram illustrating the structure of a vertically polarized gyrotropic metamaterial.
Figure 3C:
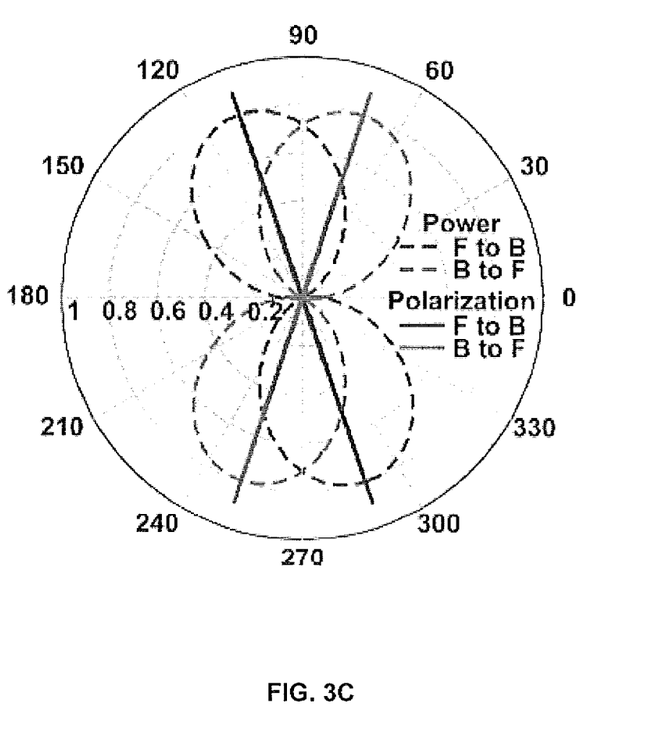
FIG. 3C is a graph illustrating polarizations and power patterns at a receiver when a vertically polarized wave is incident at different directions.

The single polarized model with the horizontal wires 60 used for DC supply through the center of the amplifier circuit board 62 is shown in FIG. 3B. The dimension of this model is still 60 mm*60 mm*30 mm and the length of each dipole is 29 mm with 0.5 mm gap at the middle. The substrates of the front 56, back 58 and circuit boards are 1 mm FR4 with relative permittivity 4.6 and loss tangent 0.02. The directions of the amplifier A are marked by arrows 64. The lumped elements mounted on the circuit board 62 are C1=100 pF, C2=10 nF, L1=L2=27 nH. By providing a vertically polarized wave incident from each side of the structure 55, the gyrotropic properties are obtained at the frequency 88545 MHz shown in FIG. 3C. Looking along from the source to the receiver, the polarized angle changes are +16.75 degree and −16.75 degree with incident directions from front side to back side and from back side to front side, respectively. The DC voltage of the amplifier for these results is 0.533 V.

Figure 4A:
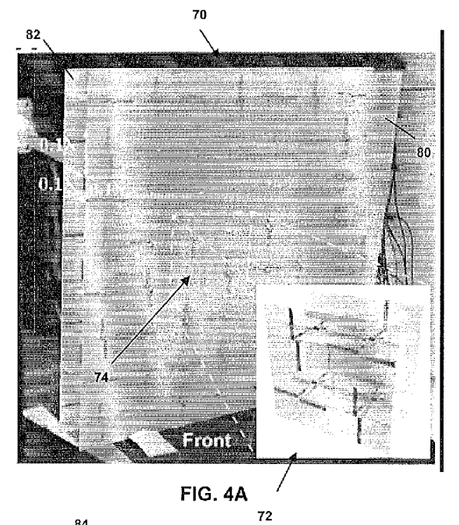
FIG. 4A-4D are schematic diagrams and graphs illustrating a single-polarized gyrotropic metamaterial sample and its experimental results.
Figure 4B:
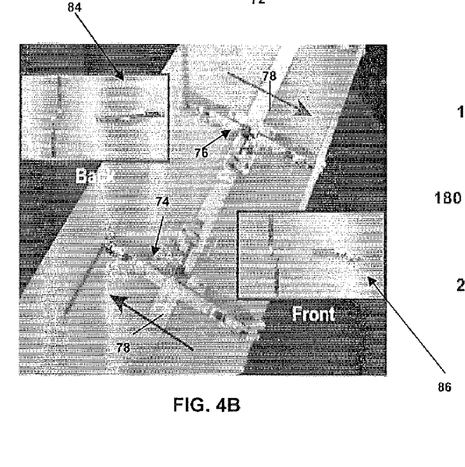

FIG. 4A shows a sample 72 of the invention having 4*4 unit cells 74, as shown in inlet 72, and FIG. 4B shows the circuit boards 74, 76 on the top half of the unit cell 74 inlet illustrating the front and back view inlets 84, 86. The arrows 78 indicate the directions of the amplifiers. A two-ridge horn antenna, serving as the source, is polarized along the vertical direction and driven with power at 10 dBm by an Agilent 8350B Sweep Oscillator. A 133 mm length dipole antenna on a 1 mm thick FR4 substrate serves as a detector on the other side of the sample and is rotated to measure the polarization of the field through an Agilent 8756A Scalar Network Analyzer. The polarization change is measured with the wave incident from front dielectric board 80 to back dielectric board 82 of the sample, then horizontally flipped the sample and measured the polarization change with the wave incident from back side to front side. Seeing in the direction from the source to the detector, we can obtain the polarized angles. The DC voltage is 0.8V and the DC current is 0.19A. By using the motor and the control software in the PC, one can automatically stop rotating the detector and saved the data per 0.9 degree.

Figure 4C:
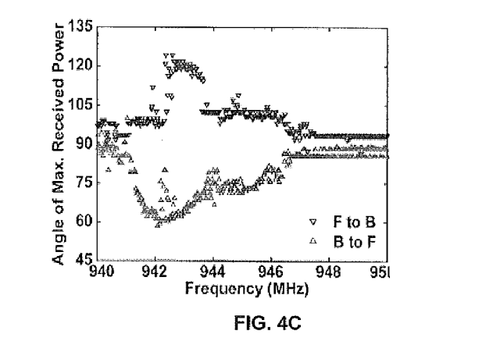
Figure 4D:
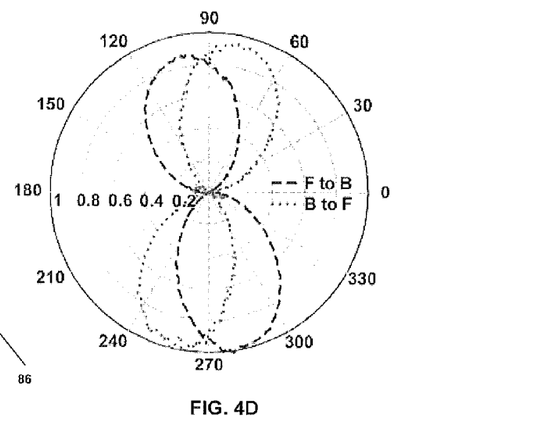

The frequency range of the Scalar Network Analyzer is set from 940 MHz to 950 MHz, in order to reduce the noise and see the changes clearly around the working frequency The measured results are shown in FIGS. 4C-4D. In particular, FIG. 4C shows the angles of the maximum received power at each frequency, and FIG. 4D shows the calibrated measured power patterns by using the free space measured data when vertically polarized wave at 946 MHz incidents. From the results one can see the polarization changes through the sample with different incident directions are opposite. The polarized angle changes are +14.4 degree and −14.4 degree with incident directions from front side to back side and from back side to front side, respectively. Thus the sample can be considered having gyrotropic behavior.

The invention introduces a systematic approach to synthesizing bulk gyrotropic metamaterials from directional circuit elements, and demonstrate strong Faraday-like rotation at microwave frequencies. This approach could contribute to exploration of nonreciprocal phenomena and devices in frequency ranges previously inaccessible to gyrotropic materials. More importantly, the invention provides an illustration of how additional control of the electromagnetic response in metamaterials incorporating active electronic circuit elements can be exploited to enable exotic lightwave phenomena.

The presented results focused on implementation of gyrotropic media via metamaterials that entail "smart" elements. However, many other kinds of metamaterials can be envisioned including implementation of: slow light (EIT-like), "super-luminal" propagation, meta-materials with gain, large FOM n<0 materials, metamaterials with arbitrary non-linearities, etc. Dynamic metamaterials can also be imagined, including: stopped light, or any of the previously mentioned metamaterials "at will" (i.e. metamaterials that (when desired) transform themselves into any arbitrary kind of metamaterial). In fact, the only limit here is imagination: one should be able to use "smart" metamaterials to implement any of the properties that already exist in nature, but also many that do not exist in any naturally existing materials.

Although the present invention has been shown and described with respect to several preferred embodiments thereof, various changes, omissions and additions to the form and detail thereof, may be made therein, without departing from the spirit and scope of the invention.

What is claimed is:

1. A gyrotropic metamaterial structure comprising:
   a plurality of chiral metamaterials forming one or more pairs of dipole structures; and
   a plurality of lumped circuits positioned between the one or more pairs of dipole structures, the lumped circuits having a plurality of antennas that are combined to change the polarization states of an incident polarized wave by producing Faraday-like rotation allowing for nonreciprocal propagation of the incident polarized wave, wherein the lumped circuits comprise an amplifier structure that amplifies the power received by the incident polarized wave and provides a selected number of the one or pairs of dipole structures while isolating the remaining one or more pairs of dipole structures.

2. The gyrotropic metamaterial structure of claim 1, wherein the chiral metamaterials are positioned on a plurality of dielectric boards to form the one or more pairs of dipole structures.

3. The gyrotropic metamaterial structure of claim 2, wherein the one or more dipole structures comprise horizontal dipoles and vertical poles.

4. The gyrotropic metamaterial structure of claim 3, wherein the horizontal dipoles and vertical dipoles are positioned on the dielectric boards.

5. The gyrotropic metamaterial structure of claim 4, wherein the Faraday-like rotation comprises at least 3 degrees of rotation thru a 0.1-wavelength thick metamaterial layer.

6. The gyrotropic metamaterial structure of claim 5, wherein the lumped circuits comprise a first inductor arrangement used for AC blocking.

7. The gyrotropic metamaterial structure of claim 6, wherein the wherein the lumped circuits comprise a plurality of capacitors used for decoupling.

8. The gyrotropic metamaterial structure of claim 7, wherein the lumped circuits comprise a second inductor arrangement for impedance matching with the amplifier structure.

9. A system for inducing gyrotropic properties in a metamaterial structure comprising:
   a plurality of chiral metamaterials forming one or more pairs of dipole structures; and
   a plurality of lumped circuits positioned between the one or more pairs of dipole structures, the lumped circuits having a plurality of antennas that are combined to change the polarization states of an incident polarized wave by producing Faraday-like rotation allowing for nonreciprocal propagation of the incident polarized wave, wherein the lumped circuits comprise an amplifier structure that amplifies the power received by the incident polarized wave and provides a selected number of the one or pairs of dipole structures while isolating the remaining one or more pairs of dipole structures.

10. The system of claim 9, wherein the chiral metamaterials are positioned on a plurality of dielectric boards to form the one or more pairs of dipole structures.

11. The system of claim 10, wherein the one or more dipole structures comprise horizontal dipoles and vertical poles.

12. The system of claim 11, wherein the horizontal dipoles and vertical dipoles are positioned on the dielectric boards.

13. The system of claim 12, wherein the Faraday-like rotation comprises 3 degrees of rotation thru a 0.1-wavelength thick metamaterial layer.

14. The system of claim 13, wherein the lumped circuits comprise a first inductor arrangement used for AC blocking.

15. The system of claim 14, wherein the wherein the lumped circuits comprise a plurality of capacitors used for decoupling.

16. The system of claim 15, wherein the lumped circuits comprise a second inductor arrangement for impedance matching with the amplifier structure.

17. A method of inducing gyrotropic properties in a metamaterial structure comprising:
   forming one or more pairs of dipole structures having a plurality of chiral metamaterials; and
   producing Faraday-like rotation allowing for nonreciprocal propagation of an incident polarized wave by positioning a plurality of lumped circuits between the one or more pairs of dipole structures, the lumped circuits having a plurality of antennas that are combined to change the polarization states of the incident polarized wave, wherein the lumped circuits comprise an amplifier structure that amplifies the power received by the incident polarized wave and provides a selected number of the one or pairs of dipole structures while isolating the remaining one or more pairs of dipole structures.

* * * * *